United States Patent [19]
Hartley et al.

[11] Patent Number: 5,379,795
[45] Date of Patent: Jan. 10, 1995

[54] VENTING APPARATUS

[75] Inventors: E. Dale Hartley, Malibu; F. Scott Hartley, Camarillo, both of Calif.

[73] Assignee: Shurflo Pump Manufacturing Co., Santa Ana, Calif.

[21] Appl. No.: 163,168

[22] Filed: Dec. 7, 1993

[51] Int. Cl.[6] .............................................. F16K 31/18
[52] U.S. Cl. ..................................... 137/202; 137/199
[58] Field of Search ................................. 137/199, 202

[56]  References Cited
U.S. PATENT DOCUMENTS 3,599,659 8/1971 Nuter et al. ........................ 137/202

OTHER PUBLICATIONS

"B.I.B. Vent", Lancer Corporation, P.N. 28-011, Jul. 13, 1989.

*Primary Examiner*—Gerald A. Michalsky
*Attorney, Agent, or Firm*—Gordon L. Peterson

[57] ABSTRACT

A venting apparatus comprising a housing having a chamber, an inlet through which fluid can be supplied to the chamber, a liquid outlet through which liquid can leave the chamber and a gas vent through which gas can leave the chamber. The apparatus also includes a pivot arm and a valve element for opening and closing the gas vent to control the flow of gas through the gas vent. The valve element is carried by the pivot arm. A pivot device mounts the pivot arm for compound movement relative to the housing to move the valve element to open the gas vent. A first portion of the compound movement is about a first fulcrum and a second portion of a compound movement is bodily away from the gas vent and is different from the first portion of the compound movement. A float is mounted for movement in the chamber and is drivingly coupled to the pivot arm to drive the pivot arm to bring about such compound movement.

23 Claims, 5 Drawing Sheets

VENTING APPARATUS

BACKGROUND OF THE INVENTION

Various liquid handling systems are subject to drawing in a gas, such as air, during operation of the system. It then becomes necessary to remove the gas from the resulting fluid so that the liquid component of the fluid can be used.

One example of a liquid handling system of this type is a beverage dispensing system in which a pump pumps a beverage component such as a juice concentrate or a soft drink syrup to a location, such as a fountain head, where it is mixed with carbonated water. During pumping of the beverage component, air may be drawn into the system, and it is necessary to vent the air from the system.

This venting function is accomplished utilizing a venting apparatus. One known venting apparatus includes a housing having both a liquid outlet through which liquid can leave the chamber and a gas vent through which gas can leave the chamber. A float controlled valve controls the opening and closing of the gas vent to thereby control the flow of gas out of the housing through the gas vent. Because the venting apparatus is downstream of the pump, the interior of the housing may be under a substantial pressure, such as 100 psi, and this creates a differential pressure which tends to hold the valve for the gas vent closed. This differential pressure could be reduced by reducing the cross sectional area of the gas vent at the valve element. However, this would correspondingly reduce the ability of the small cross sectional area vent to perform its function of quickly venting gas from the interior of the housing when the valve opens the gas vent. Rapid venting of the chamber is important to make certain that the gas does not flow into the liquid outlet.

The opening force for the gas vent is provided by the weight of the float when the liquid level within the housing drops. Several inherent constraints can make it difficult for the float to provide enough force to assure that the gas vent will open when desired. For example, the float must be light enough to float in the beverage component and therefore cannot be made substantially heavier to increase the opening force on the valve. In addition, the float cannot be made wider and therefore heavier because the float cannot take up the entire interior of the housing. It is also not desired to enlarge the housing. These factors can make it difficult for the float to operate the valve.

SUMMARY OF THE INVENTION

This invention solves these problems by providing a venting apparatus in which a float can open the gas vent as desired. With this invention, the float need not be enlarged or made heavier and the venting apparatus can be provided within a relatively small envelope.

The invention can be embodied in a venting apparatus which includes a housing having a chamber, an inlet through which fluid can be supplied to the chamber, a liquid outlet through which liquid can leave the chamber and a gas vent through which gas can leave the chamber. A valve element is provided in the housing for opening and closing the gas vent to control the flow of gas through the gas vent. The valve element is carried by a pivot arm.

An important feature of this invention is a pivot device for mounting the pivot arm for compound movement relative to the housing to move the valve element to open the gas vent. A first portion of the compound movement is about a first pivot axis or fulcrum and a second portion of the compound movement is bodily away from the gas vent and is different from the first portion of the compound movement. A float is mounted for movement in the chamber and is drivingly coupled to the pivot arm to drive the pivot arm to bring about such compound movement.

One important capability of the pivot device is that the first fulcrum and the valve element can be located to increase or maximize the leverage provided by the pivot arm. Consequently, the weight of the float acting on the valve element tending to open the gas vent is multiplied sufficiently to overcome the pressure within the housing tending to hold the valve element in a position to close the gas vent.

To increase leverage, the valve element is preferably relatively close to the first fulcrum. Consequently, pivotal movement of the pivot arm in a direction to open the gas vent does not tend to move the valve element very far from an annular valve seat at the inner end of the gas vent. In order to increase this separation and allow the rapid and proper venting of gas within the housing, the pivot device provides for a second portion of the compound movement to occur. As indicated above, this second portion of the compound movement is bodily away from the gas vent, and more particularly, the valve seat. This second portion of the compound movement is not simply a continuation of the pivotal movement. Rather, the pivot arm is allowed to move bodily away from the gas vent to significantly increase the spacing between the valve element and the valve seat.

Although the pivot device can be constructed in any suitable manner to provide this compound movement, preferably the pivot device includes fulcrum surfaces carried by the housing and the pivot arm which are engageable. Preferably one of the fulcrum surfaces includes a ridge. The first fulcrum is along a region of engagement of these fulcrum surfaces. This construction is inexpensive, devoid of hinge pins and essentially requires no assembly. It also facilitates placement of the valve element and first fulcrum in close proximity to gain increase leverage. Also this construction permits movement of the fulcrum surface of the pivot arm away from the fulcrum surface of the housing to allow the second portion of the compound movement to occur.

Preferably the pivot device includes a second pivot axis or fulcrum spaced from the first fulcrum and the pivot arm pivots about the second fulcrum in moving to a position in which the valve element closes the gas vent. In a preferred construction, the pivot device includes a member carried by the housing. A groove and a pin receivable in the groove are provided on the member and the pivot arm or the pivot arm and the member and they provide the second fulcrum. One advantage of this construction is its simplicity and ease of assembly. With respect to assembly, all that is required is to drop the pin into the groove. Because obtaining sufficient leverage to close the vent is not difficult, the second fulcrum can be farther from the vent than the first fulcrum.

The structures which provide the first and second fulcrums or pivot axes also cooperate with each other. For example, a member which is carried by the housing and the pivot arm, have cooperating portions which mount the pivot arm for pivotal movement about the second fulcrum or pivot axis. These cooperating portions also allow movement of the pivot arm to permit the fulcrum surfaces to engage and disengage. These cooperating portions, which preferably include a groove and a projection, may allow the second portion of the compound movement to occur by allowing the pin to drop deeper into the groove. Preferably the fulcrum surface carried by the pivot arm is between the projection and the gas vent and the valve element is between the float and the fulcrum surface carried by the pivot arm.

The venting apparatus also preferably includes a driving connection between the float and the pivot arm. The driving connection allows rotational movement of the float relative to the pivot arm to reduce the likelihood of torsional forces on the vent being transmitted to the pivot arm.

The venting apparatus also preferably includes a shield carried by the housing above the float. The inlet supplies fluid to the chamber of the housing above the shield and the shield directs the fluid so it can flow downwardly along the periphery of the chamber. This prevents the fluid from falling on the float where it could interfere with the operation of the opening and closing of the gas vent. In a preferred construction, the shield is snap fit onto a portion of the housing.

The invention, together with additional features and advantages thereof may best be understood by reference to the following description taken in connection with the accompanying illustrative drawings.

DESCRIPTION OF THE PREFERRED EMBODIMENT

Figure 1:
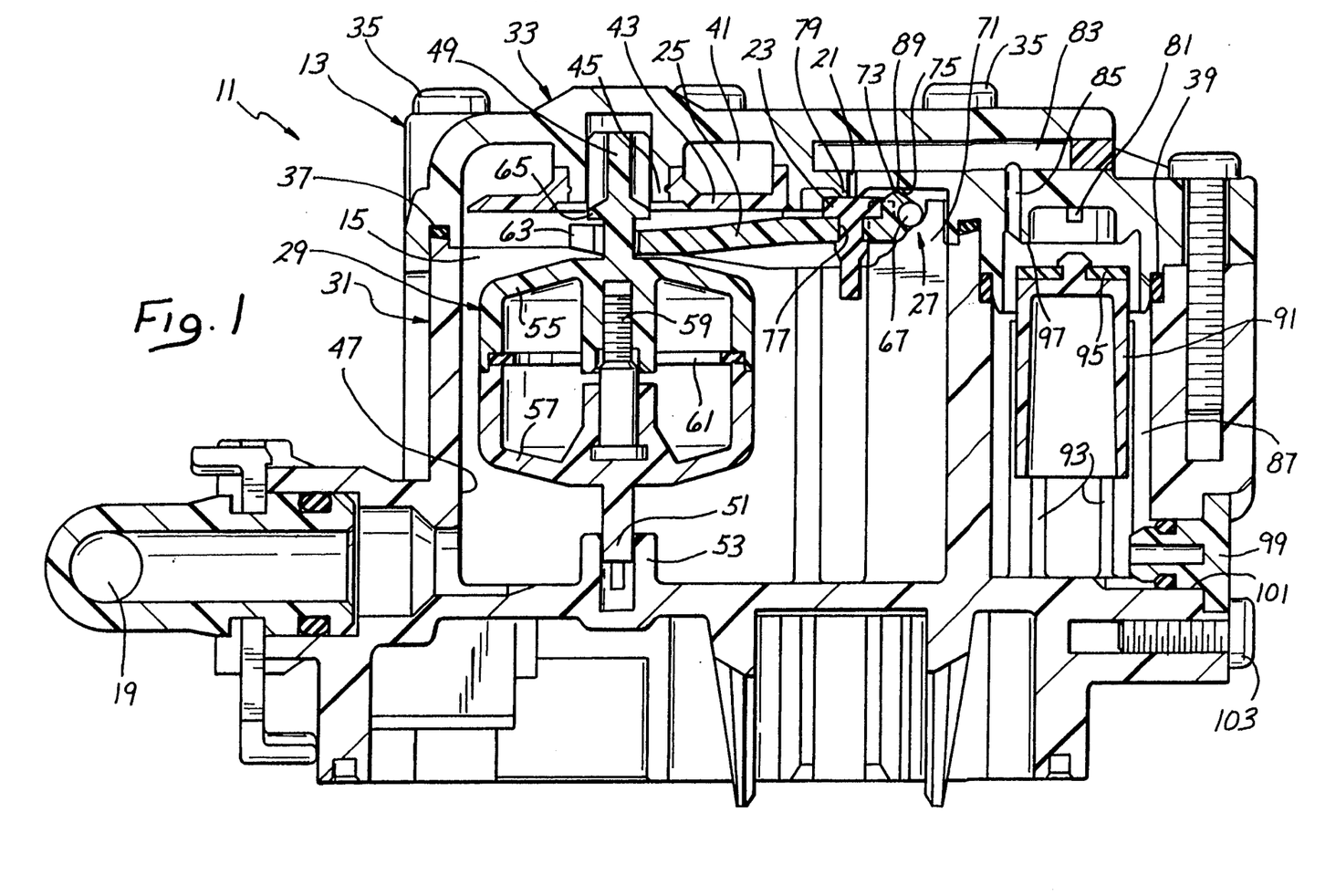
FIG. 1 is an axial sectional view through one preferred form of venting apparatus constructed in accordance with the teachings of this invention and showing the gas vent closed.
Figure 2:
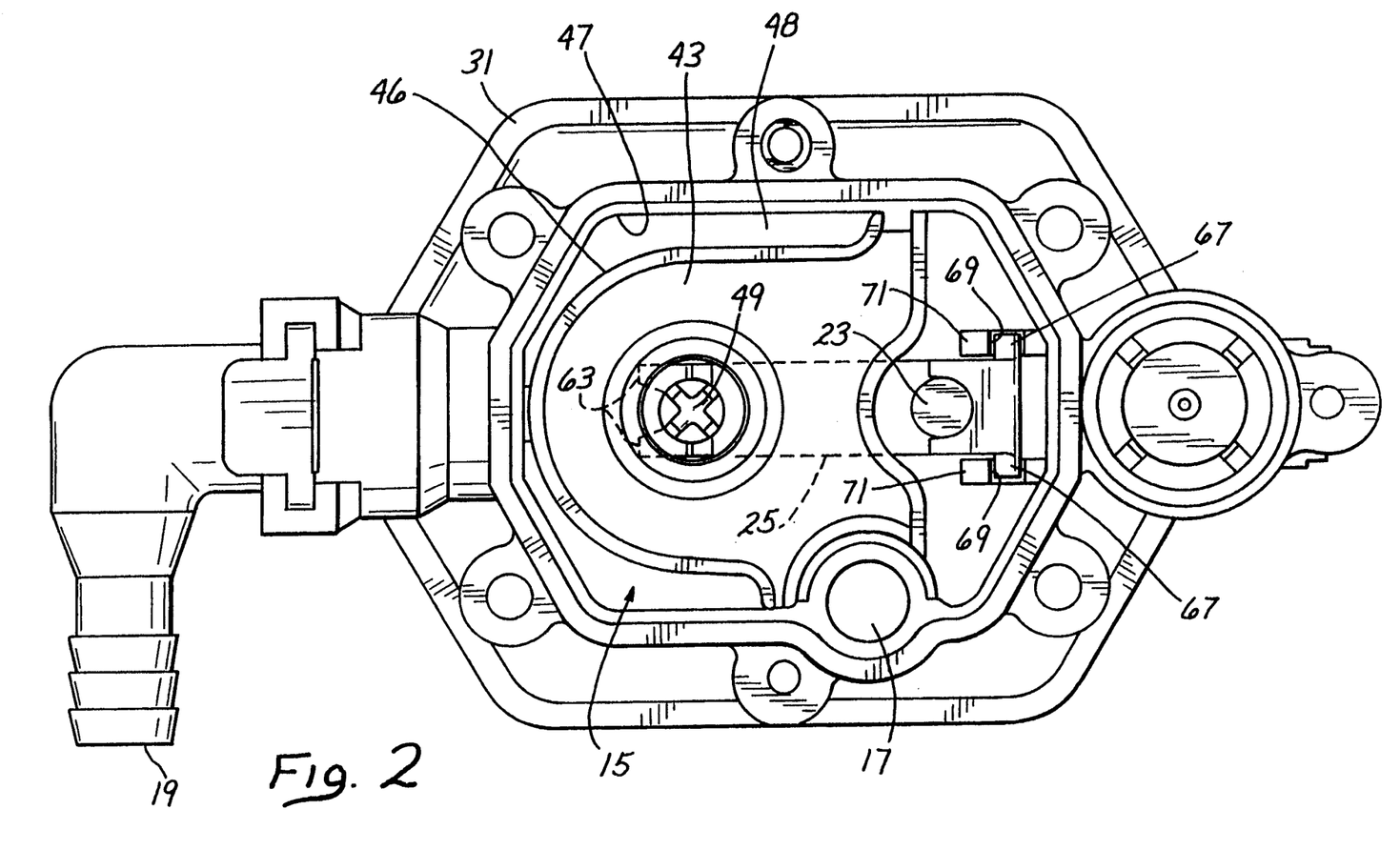
FIG. 2 is a top plan view of the venting apparatus with the top cover removed.
Figure 3:
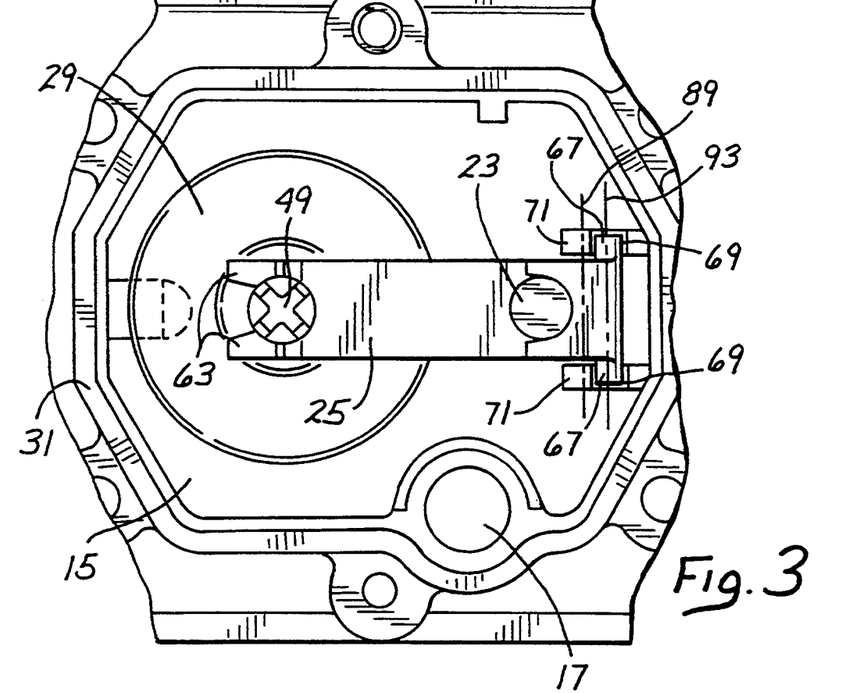
FIG. 3 is a fragmentary top plan view of the venting apparatus with the cover and shield removed.

FIGS. 1-3 show a venting apparatus 11 which generally includes a housing 13 having a chamber 15, an inlet 17 (FIGS. 2 and 3) through which fluid can be supplied to the chamber, a liquid outlet 19 through which liquid can leave the chamber and a gas vent 21 through which gas can leave the chamber. The venting apparatus also includes a valve element 23 for opening and closing the gas vent 21 to control the flow of gas through the gas vent and a pivot arm 25 which carries the valve element. A pivot device 27 mounts the pivot arm 25 for compound movement relative to the housing 13 and a float 29 is mounted for movement in the chamber 15 and is drivingly coupled to the pivot arm 25 to drive the pivot arm.

Although the housing 13 can be of various different constructions, in this embodiment it includes a main body 31 and a cover 33 removably mounted on the main body 31 in any suitable manner such as by screws 35. The interface between the main body 31 and the cover 33 is appropriately sealed by O-rings 37 and 39. The main body 31 and the cover 33 are preferably molded from a suitable polymeric material.

The inlet 17 is supplied with a fluid under pressure from a pump (not shown). The venting apparatus 11 is particularly adapted to receive a beverage component such as a soft drink syrup or concentrate from the pump shown and described in applicants' co-pending application Ser. No. 135,735 filed on Oct. 13, 1993 and entitled Offset Reciprocable Device. The fluid supplied to the inlet 17 may, at least at times, contain a gas such as air.

Liquid from the inlet 17 enters an upper compartment 41 (FIG. 1) which is above a shield 43 which is snap fit onto a portion or boss 45 of the cover 33. The upper compartment 41 forms an upper portion of the chamber 15 and the shield 43 is above the float 31 and has a periphery 46 (FIG. 2), a major portion of which is spaced from the periphery 47 of the chamber-to provide an opening 48. Consequently, the shield 43 directs the fluid so it flows downwardly along the periphery 47 of the chamber 15 thereby protecting the float 29 from the descending fluid. In addition, causing the fluid to flow along the periphery 47 of the chamber 15 tends to produce laminar flow which reduces foaming.

The liquid accumulates in the bottom of the chamber 15 and is withdrawn through the outlet 19 in accordance with the demand for the liquid. The liquid in the chamber 15, being downstream of the system pump (not shown) is under pump discharge pressure. Accordingly, the utilization of the liquid and its flow out through the outlet 19 can be controlled by a valve (not shown) downstream of the outlet. For example, in a beverage system the valve may be or include the valve at the fountain head.

The float 29 is mounted for vertical movement in the chamber 15 by shafts 49 and 51 which are received in the boss 45 and a lower boss 53, respectively, which form, in effect, bearings for these shafts. This mounts the float 29 for vertical movement in the chamber 15 and also permits rotation of the float about the axes of the shafts. Although the float 29 can be of various different constructions, in this embodiment, it includes shell-like float sections 55 and 57 coupled together by a screw 59 and sealed by an annular seal 61.

The pivot arm 25 has a forked distal end 63 which loosely receives a portion of the shaft 49 between the float section 55 and an annular flange 65 on the shaft 49 so that the float 29 can rotate about the vertical axis defined by the shafts 49 and 51 without applying torque to the pivot arm 25. The proximal end of the pivot arm 25 has a pair of outwardly extending pins 167 which are loosely received in upwardly opening grooves or saddles 69, respectively, of vertical members or posts 71 integral with the main body 31. The upwardly opening grooves 69 permit the pivot arm to be assembled onto the posts 71 by simply dropping the pins 67 into the corresponding grooves. As shown in FIGS. 1-3, the pins 67 are at the very proximal end of the pivot arm 25.

Figure 5:
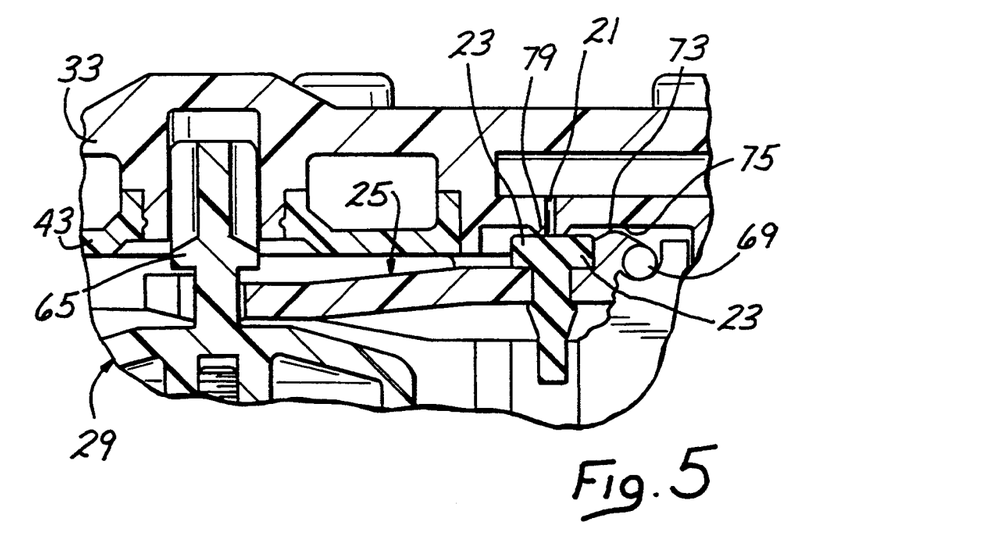
FIG. 5 is a fragmentary sectional view taken on the plane of FIG. 1 showing the gas vent in the closed position.

The pivot device 27 includes the pins 67 and the grooves 69 as well as confronting fulcrum surfaces 73 and 75 on the pivot arm 25 and the housing 75, respectively. As best seen in FIG. 5, the fulcrum surface 73 is in the form of a bump or upwardly extending ridge on the pivot arm 25 and the fulcrum surface 75 is a planar surface on the inner face of the cover 33. In the position of FIGS. 1 and 5 where the gas vent 21 is closed, the fulcrum surfaces 73 and 75 are spaced slightly, e.g. from about 0.010 to about 0.015 inch, to prevent the pivot arm 25 from becoming bound or prevented from freely moving to open the gas vent 21.

The valve element 23, which may be an elastomeric member, is suitably carried by the pivot arm 25, and in this embodiment, can be snapped through an aperture 77 in the pivot arm and retained by flanges above and below the aperture. As such, the valve element 23 is closely adjacent the fulcrum surface 73 and is between that fulcrum surface and the float 29 whereas the fulcrum surface 73 is between the pins 67 and the valve element 23.

The valve element 23 cooperates with an annular valve seat 79 which projects downwardly and which surrounds the inner end of the gas vent 21, the latter being in the form of a small diameter passage in the cover 33. The fulcrum surface 73 is between the valve seat 79 and the pins 67. The valve element 23 and the valve seat 79 cooperate to form a valve for opening and closing of the gas vent 21. As shown in FIG. 1, the gas vent 21 leads to a gas outlet 81 via a passage 83 in the cover 33, a branch passage 85 and a collection compartment 87.

When the level of liquid in the chamber 15 is above a predetermined level, the float 29, which floats in the liquid, engages the underside of the pivot arm 25 and tends to hold the valve element 23 in sealing engagement with the valve seat 79 to close the gas vent 21. In addition, the pressure in the chamber 15 acts over the entire area of the underside of the pivot arm 25 and the valve element 23 and tends to push the valve element 23 to the closed position against the valve seat 79. The fluid under pressure also acts on the top surface of the pivot arm 25 and the top surface of the valve element 23, except for the area surrounded by the valve seat 79, and tends to push the valve element toward the open position in which it is spaced from the valve seat. However, because the area resulting in a closing force exceeds the area resulting in an opening force, there is a differential force tending to close the gas vent 21.

Figure 6:
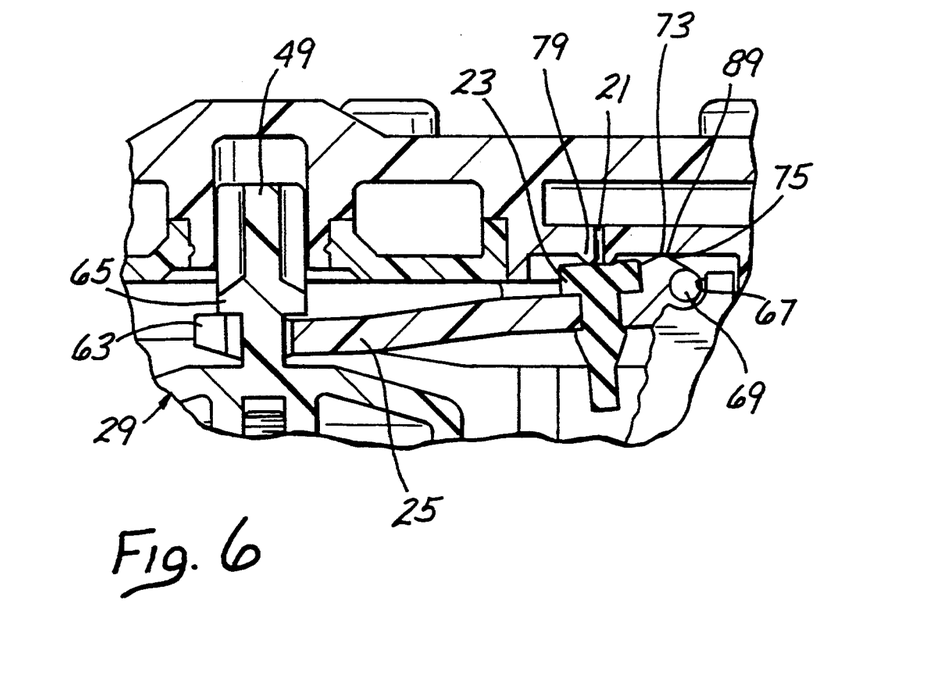
FIG. 6 is a fragmentary sectional view similar to FIG. 5 with the pivot arm being moved slightly by the float to place the fulcrum surfaces on the pivot arm and housing into engagement.

As the liquid level in the chamber 15 drops, the float 23 descends with it. Ultimately, the flange 65 contacts the forked distal end 63 of the pivot arm 25 and the weight of the float 29, less any buoyancy effect from the liquid acting on the float, tends to urge the pivot arm 25 downwardly, i.e. counterclockwise as viewed in FIG. 5. This tends to pry or tilt the pivot arm 25 about the projecting valve seat 79 to raise the fulcrum surface 73 of the pivot arm into engagement with the fulcrum surface 75 of the housing 13 as shown in FIG. 6. The valve element 23 remains sealingly engaged with the valve seat 79 during this prying movement and so the gas vent 21 remains closed. However, this initial prying movement sets up or positions the pivot arm 25 for the desired compound opening movement.

Figure 4:
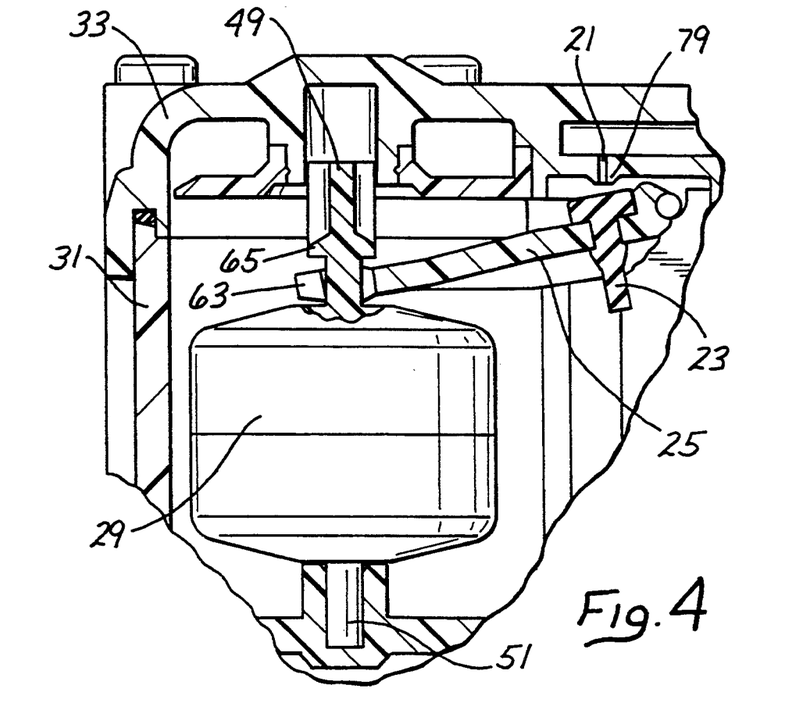
FIG. 4 is a fragmentary sectional view taken on the plane of FIG. 1 with the gas vent open and with the float shown in elevation.
Figure 8:
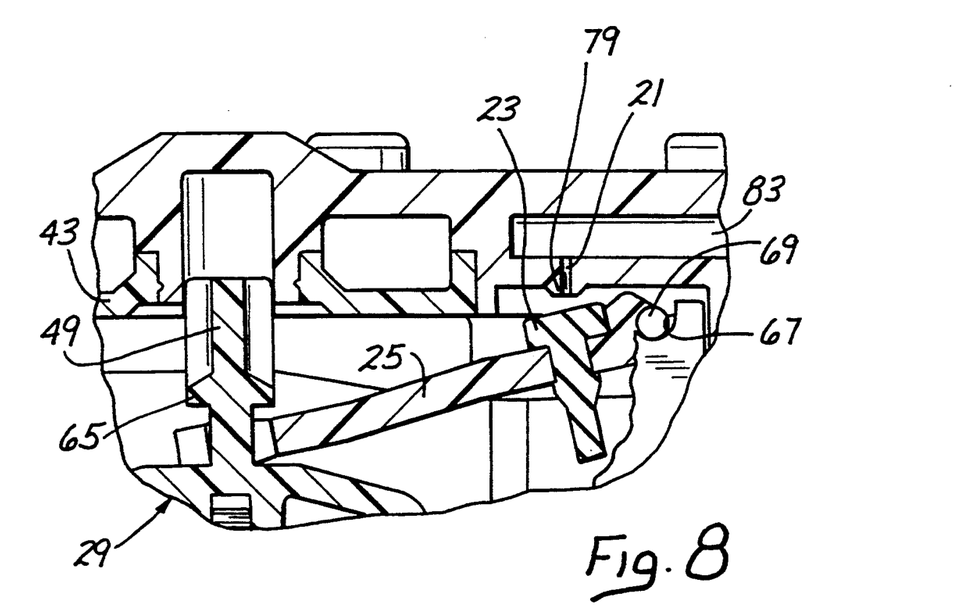

The pivot device 27 mounts the pivot arm 25 for compound movement relative to the housing 13 to move the valve element 23 to open the gas vent 21 as shown in FIGS. 4 and 8. A first fulcrum or pivot axis 89 (FIGS. 3 and 6) is defined by the engagement of the fulcrum surfaces 73 and 75 in the closed position, i.e. when the valve element 23 sealing engages the valve seat 79 to close the gas vent 21. A second fulcrum or pivot axis 93 (FIG. 3), which is spaced proximally from the first pivot axis 89, is defined by the pins 67 and the grooves 69.

Figure 7:
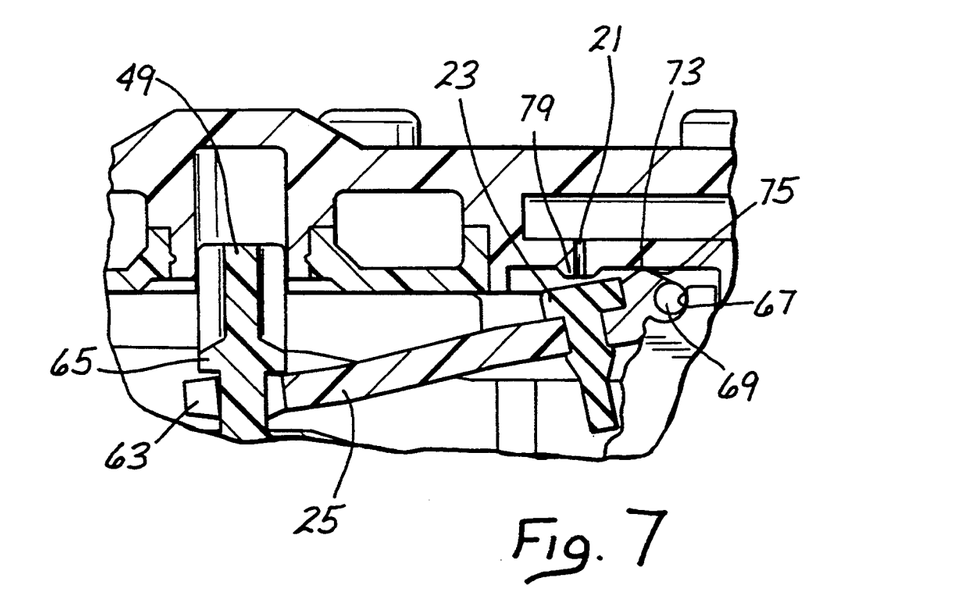
FIGS. 7 and 8 are fragmentary sectional view taken on the plane of FIG. 1 showing the gas vent in the partially open and fully open positions, respectively.

Continued downward movement of the float 29 with the descending liquid level applies a counterclockwise force to the pivot arm 25 about the first fulcrum or pivot axis 89 (FIGS. 3 and 6) which tends to pivot the pivot arm toward the position of FIG. 7. Eventually, the reducing level of liquid in the chamber 15 reduces the upward buoyancy force on the float 29 sufficiently so that the weight of the float can pivot the pivot arm 25 about the first fulcrum 89 to separate the valve element 23 from the valve seat 79 and open the gas vent 21 as shown in FIG. 7. It should be noted that the first fulcrum 89 is very close to the proximal end of the pivot arm 25 to achieve high leverage from the force applied by the float and that the valve seat 79 is very close to the first fulcrum 89 to achieve low leverage from the differential force resulting from the differential pressure. In other words, the opening force is multiplied much more than the closing force.

As the pivot arm 25 pivots about the first fulcrum 89, the pins 67 ride up in the grooves 69 as shown in FIG. 7. The pins 67 riding in the grooves 69 also prevent significant relative sliding movement between the fulcrum surfaces 73 and 75. The pivotal movement of the pivot arm 25 about the first fulcrum 89 constitutes a first portion of the compound movement provided by the pivot device 27.

Once the valve element 23 separates from the valve seat 79 as a result of the pivotal movement about the first fulcrum 89 as shown in FIG. 7, the differential pressure acting to close the gas vent 21 is eliminated. Consequently, there is no force acting to close the gas vent 21 and consequently the pins 67 can fall downwardly under the influence of gravity in the grooves 69 to thereby bodily move the pivot arm 25 and the valve element 23 away from the valve seat 79 and the gas vent 21 to further separate the valve element from the valve seat as shown in FIGS. 4 and 8. This movement of the valve element 23 and pivot arm 25 away from the valve element 79 constitutes a second portion of the compound movement. If this second portion of the compound movement did not occur, the degree to which the gas vent 21 is open by the pivotal portion of the compound movement as shown in FIG. 7 may not be sufficient to rapidly vent the chamber 15.

As the liquid level in the chamber 15 increases, the float 29 is floated upwardly and the upper surface of the float section 55 (FIG. 1) pushes the distal end 63 of the pivot arm 25 upwardly about the second fulcrum or pivot axis 93. This pivotal motion about the second fulcrum 93 seats the valve element on the valve seat 79 to close the gas vent 21.

The gas, such as air, which is vented can flow through the passage 83, the branch passage 85 and the collection chamber 87 to the gas outlet 81. Some liquid may be carried by the gas through this passage to the collection compartment 87 where it is allowed to settle. A secondary float 91 is mounted for vertical movement in the collection chamber in any suitable manner such as by upstanding legs 93 (FIG. 1). Over a long period of operation, the liquid level in the collection compartment 87 rises to elevate the float 91 until an annular gasket 95 carried by the secondary float 91 sealing engages a valve seat 97 whereupon the gas outlet 81 is shut off from communication with the branch passage 85. When this occurs, the venting apparatus 11 is no longer effective to vent gas. However, by removing a drain plug 99 from the side of the housing 13, the accumulation of liquid in the collection compartment 87 can be drained. This allows the secondary float 91 to descend thereby opening the gas outlet 81 so that the venting apparatus 11 can be used. In this embodiment, the drain plug 99 is retained within a drain opening 101 in the housing 13 by a screw 103.

Although an exemplary embodiment of the invention has been shown and described, many changes, modifications and substitutions may be made by one having ordinary skill in the art without necessarily departing from the spirit and scope of this invention.

We claim:

1. A venting apparatus comprising:
   a housing having a chamber, an inlet through which fluid can be supplied to the chamber, a liquid outlet through which liquid can leave the chamber and a gas vent through which gas can leave the chamber;
   a valve element for opening and closing the gas vent to control the flow of gas through the gas vent;
   a pivot arm, said valve element being carried by the pivot arm;
   a pivot device for mounting the pivot arm for compound movement relative to the housing to move the valve element to open the gas vent, a first portion of said compound movement being about a first fulcrum and a second portion of said compound movement being bodily away from the gas vent and being different from the first portion of said compound movement; and
   a float mounted for movement in said chamber and drivingly coupled to said pivot arm to drive the pivot arm to bring about said compound movement.

2. A venting apparatus as defined in claim 1 wherein the pivot device includes fulcrum surfaces carried by the housing and the pivot arm, respectively, which are engageable, said first fulcrum being along a region of engagement of said fulcrum surfaces.

3. A venting apparatus as defined in claim 2 wherein said fulcrum surface of said pivot arm is movable away from said fulcrum surface of said housing to allow said second portion of said compound movement to occur.

4. A venting apparatus as defined in claim 2 wherein one of the fulcrum surfaces includes a ridge engageable with the other of the fulcrum surfaces to provide said region of engagement.

5. A venting apparatus as defined in claim 1 wherein said pivot device provides a second fulcrum spaced from said first fulcrum and said pivot arm pivots about said second fulcrum in moving to a position in which the valve element closes the gas vent.

6. A venting apparatus as defined in claim 5 wherein the pivot device includes a member carried by said housing, one of said member and said pivot arm having a groove and the other of said member and the pivot arm includes a pin receivable in said groove, and said groove and pin provide said second fulcrum.

7. A venting apparatus as defined in claim 6 wherein the groove is open and is on said member whereby said pin can be dropped into said groove to provide said second fulcrum.

8. A venting apparatus as defined in claim 5 wherein said second fulcrum is farther from said vent than said first fulcrum.

9. A venting apparatus as defined in claim 5 wherein the pivot device includes fulcrum surfaces carried by the housing and the pivot arm, respectively, which are engageable, said first fulcrum being along a region of engagement of said fulcrum surfaces.

10. A venting apparatus as defined in claim 1 including a shield carried by said housing above said float, said inlet supplying fluid to said chamber above said shield, and said shield directs the fluid so it flows downwardly along the periphery of the chamber.

11. A venting apparatus as defined in claim 1 including a shield carried by said housing above said float, said inlet supplying fluid to said chamber above said shield, and said shield allows fluid to flow downwardly in the chamber whereby the fluid flowing downwardly tends not to fall on the float.

12. A venting apparatus as defined in claim 1 including a shield carried by said housing above said float, said inlet supplying fluid to said chamber above said shield, and said shield is snap fit onto a portion of said housing.

13. A venting apparatus as defined in claim 1 including a driving connection between said float and said pivot arm, said driving connection allowing rotational movement of said float relative to said pivot arm.

14. A venting apparatus comprising:
    a housing having a chamber, an inlet through which fluid can be supplied to the chamber, a liquid outlet through which liquid can leave the chamber and a gas vent through which gas can leave the chamber;
    a valve element for opening and closing the gas vent to control the flow of gas through the gas vent;
    a pivot arm, said valve element being carried by the pivot arm;
    fulcrum surfaces carried by the housing and the pivot arm which are engageable to provide a first pivot axis for the pivot arm;
    a member carried by said housing;
    said member and said pivot arm having cooperating portions for mounting the pivot arm for pivotal movement about a second pivot axis and which allows movement of the pivot arm to permit the fulcrum surfaces to engage and disengage; and
    a float mounted for movement in said chamber and drivingly coupled to said pivot arm to drive the pivot arm.

15. An apparatus as defined in claim 14 wherein the cooperating portions include a groove on one of the member and the pivot arm and a projection on the other of the member and the pivot arm.

16. An apparatus as defined in claim 15 wherein the groove is open to receive the projection.

17. An apparatus as defined in claim 16 wherein the fulcrum surface carried by the pivot arm is between the projection and the gas vent and the valve element is between the float and the fulcrum surface carried by the pivot arm.

18. An apparatus as defined in claim 14 including a shield carried by said housing above said float, said inlet supplying fluid to said chamber above the shield.

19. An apparatus as defined in claim 14 including a driving connection between said float and said pivot arm, said driving connection allowing rotational movement of said float relative to said pivot arm.

20. An apparatus as defined in claim 14 wherein one of the fulcrum surfaces includes a ridge engageable with the other of the fulcrum surfaces to provide said region of engagement.

21. A venting apparatus comprising:

a housing having a chamber, an inlet through which fluid can be supplied to the chamber, a liquid outlet through which liquid can leave the chamber and a gas vent through which gas can leave the chamber;

a valve for opening and closing the gas vent to control the flow of gas through the gas vent, said valve including a valve seat adjacent the gas vent and a valve element engageable with the valve seat to close the gas vent and movable away from the valve seat to open the gas vent;

a pivot arm, said valve element being carried by the pivot arm;

a pivot device for mounting the pivot arm for compound movement relative to the valve seat to move the valve element away from the valve seat to open the gas vent, a first portion of said compound movement being about a first fulcrum and a second portion of said compound movement being bodily away from the valve seat and being different from the first portion of said compound movement; and a float mounted for movement in said chamber and drivingly coupled to said pivot arm to drive the pivot arm to bring about said compound movement.

22. An apparatus as defined in claim 21 wherein the pivot device includes fulcrum surfaces carried by the housing and the pivot arm, respectively, which are spaced apart and the pivot arm can be tilted about the valve element to place said fulcrum surfaces into engagement, said first fulcrum being along a region of engagement of said fulcrum surfaces.

23. An apparatus as defined in claim 22 wherein the valve seat forms a projection about which the valve element can tilt to place the fulcrum surfaces in engagement.

* * * * *